US012198026B2

United States Patent
Bendre et al.

(10) Patent No.: US 12,198,026 B2
(45) Date of Patent: Jan. 14, 2025

(54) SYSTEMS, METHODS, AND COMPUTER PROGRAM PRODUCTS FOR GENERATING NODE EMBEDDINGS

(71) Applicant: Visa International Service Association, San Francisco, CA (US)

(72) Inventors: Mangesh Bendre, Sunnyvale, CA (US); Mahashweta Das, Campbell, CA (US); Fei Wang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/015,976

(22) PCT Filed: May 24, 2022

(86) PCT No.: PCT/US2022/030676
§ 371 (c)(1),
(2) Date: Jan. 13, 2023

(87) PCT Pub. No.: WO2022/251178
PCT Pub. Date: Dec. 1, 2022

(65) Prior Publication Data
US 2023/0196198 A1    Jun. 22, 2023

Related U.S. Application Data

(60) Provisional application No. 63/192,721, filed on May 25, 2021.

(51) Int. Cl.
*G06N 20/00* (2019.01)
*G06N 5/022* (2023.01)

(52) U.S. Cl.
CPC ............ *G06N 20/00* (2019.01); *G06N 5/022* (2013.01)

(58) Field of Classification Search
CPC .............................. G06N 5/022; G06N 20/00
(Continued)

(56) References Cited

U.S. PATENT DOCUMENTS 3,569,958 A  *  3/1971  Gabriel ................... G06J 1/00
                                                          708/4
7,242,408 B1 *  7/2007  Dunn ...................... G06T 15/50
                                                        345/428

(Continued)

FOREIGN PATENT DOCUMENTS

CN        112417633 A      2/2021

OTHER PUBLICATIONS

Learning Community Embedding with Community Detection and Node Embedding on Graphs (Year: 2017).*
(Continued)

*Primary Examiner* — Omar F Fernandez Rivas
*Assistant Examiner* — Em N Trieu
(74) *Attorney, Agent, or Firm* — The Webb Law Firm (57) ABSTRACT

Provided are systems, methods, and computer program products for generating node embeddings. The system includes at least one processor programmed or configured to generate a graph comprising a plurality of nodes, generate an embedding for each node of the plurality of nodes, each embedding comprising at least one polar angle and a vector length, store each embedding of a plurality of embeddings in memory, and in response to processing the graph with a machine-learning algorithm, convert at least one embedding of the plurality of embeddings to Cartesian coordinates.

21 Claims, 5 Drawing Sheets

(58) Field of Classification Search
USPC .......................................................... 706/12
See application file for complete search history.

(56) References Cited

U.S. PATENT DOCUMENTS

| | | | |
|---|---|---|---|
| 10,482,183 | B1 | 11/2019 | Vargas et al. |
| 2005/0163243 | A1* | 7/2005 | Chung .................. H04L 1/0643 375/267 |
| 2019/0355346 | A1 | 11/2019 | Bellegarda |
| 2020/0226422 | A1* | 7/2020 | Li ............................ G06N 3/04 |
| 2020/0250734 | A1 | 8/2020 | Pande et al. |
| 2021/0049209 | A1 | 2/2021 | Shi |
| 2021/0064959 | A1* | 3/2021 | Gui ........................ G06N 3/045 |
| 2021/0109995 | A1 | 4/2021 | Mihindukulasooriya et al. |
| 2022/0100956 | A1* | 3/2022 | Iwamoto ................. G06F 40/30 |
| 2022/0119871 | A1* | 4/2022 | Regev ...................... C12N 9/22 |

OTHER PUBLICATIONS

Sandro et al. Learning Community Embedding with Community Detection and Node Embedding on Graphs, Nanyang Technological University Singapore, sandro001@e.ntu.edu.sg, (Nov. 6-10, 2017, pp. 377-386) (Year: 2017).*

Orna et.al. Interpreting Neural-Network Results: A Simulation Study, Center for Gerontology and Health Care Research Brown University, Orna Intrator@Brown.Edu. (2001, pp. 1-17) (Year: 2001).*

Chen et al., "A Tutorial on Network Embeddings", arXiv:1808.02590v1, 2018, pp. 1-23.

Mohoney et al., "Learning Massive Graph Embeddings on a Single Machine", Cornell University Library, 2021, pp. 1-33.

Xu, "Understanding Graph Embedding Methods and their Applications", Cornell University Library, 2020, pp. 1-15.

* cited by examiner

SYSTEMS, METHODS, AND COMPUTER PROGRAM PRODUCTS FOR GENERATING NODE EMBEDDINGS

CROSS REFERENCE TO RELATED APPLICATIONS

This application is the United States national phase of International Application No. PCT/US2022/030676 filed May 24, 2022, and claims priority to U.S. Provisional Patent Application No. 63/192,721, filed May 25, 2021, the disclosures of which are hereby incorporated by reference in their entirety.

BACKGROUND

1. Technical Field

Disclosed embodiments or aspects relate generally to machine-learning and, in one particular embodiments or aspects, to systems, methods, and computer program products for generating node embeddings for machine-learning models.

2. Technical Considerations

It is advantageous to reduce the computational complexity and memory requirements for graph embedding training processes for machine-learning models. There has been an increase in representing data that is not naturally connected as graphs in order to understand a number of applications such as vehicular network design to Internet-of-Things traffic management. There has been a surge in the use of machine-learning on graphs and networks with objects with respect to the neighboring world instead of just observing them in isolation. Machine-learning models that utilize graphs have increased computational time for their embeddings as the size of the graph grows. Increased computational time results in increased training time for the machine-learning models. Increased graph size also results in a large number of nodes and edges that can increase data skew. Therefore, there is a need in the art for an improved system and method for generating node embeddings for machine-learning models using fast, scalable, memory-efficient, and high-quality representation learning for graphs.

SUMMARY

Accordingly and generally, provided is an improved system, method, and computer program product for node embedding in machine-learning.

According to non-limiting embodiments or aspects, provided is a method for node embedding, comprising: generating, with at least one processor, a graph comprising a plurality of nodes; generating, with the at least one processor, an embedding for each node of the plurality of nodes, each embedding comprising at least one polar angle and a vector length; storing, with the at least one processor, each embedding of the plurality of embeddings in memory; and in response to processing the graph with a machine-learning algorithm, converting at least one embedding of the plurality of embeddings to Cartesian coordinates.

In non-limiting embodiments or aspects, the vector length of each embedding is the same value. In non-limiting embodiments or aspects, the at least one polar angle for each embedding is represented in a range of integers between a maximum value and a minimum value, further comprising: linking the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value. In non-limiting embodiments or aspects, the at least one polar angle is represented by a 2-byte signed integer. In non-limiting embodiments or aspects, wherein converting the at least one embedding of the plurality of embeddings to Cartesian coordinates comprises transforming each polar angle of the embedding into two different Cartesian coordinates. In non-limiting embodiments or aspects, the polar representation-based embeddings are initialized using uniform random distributions, which implies that the corresponding Cartesian representation of the embeddings are initialized using normal distribution with a mean of zero and a variance of 0.5. In non-limiting embodiments or aspects, further comprising: pre-training a machine-learning model comprising the graph; training the machine-learning model, resulting in trained embeddings; and exporting the trained embeddings. In non-limiting embodiments or aspects, pre-training the machine-learning model comprises organizing the graph based on negative samples that comprise, for a vertex, two hop neighboring nodes that do not share an edge with the vertex.

According to non-limiting embodiments or aspects, provided is a system for node embedding, comprising at least one processor programmed or configured to: generate a graph comprising a plurality of nodes; generate an embedding for each node of the plurality of nodes, each embedding comprising at least one polar angle and a vector length; store each embedding of the plurality of embeddings in memory; and in response to processing the graph with a machine-learning algorithm, convert at least one embedding of the plurality of embeddings to Cartesian coordinates.

In non-limiting embodiments or aspects, the vector length of each embedding is the same value. In non-limiting embodiments or aspects, the at least one polar angle for each embedding is represented in a range of integers between a maximum value and a minimum value, the at least one processor further programmed or configured to: link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value. In non-limiting embodiments or aspects, the at least one polar angle is represented by a 2-byte signed integer. In non-limiting embodiments or aspects, converting the at least one embedding of the plurality of embeddings to Cartesian coordinates comprises transforming each polar angle of the embedding into two different Cartesian coordinates. In non-limiting embodiments or aspects, the polar representation-based embeddings are initialized using uniform random distributions, which implies that the corresponding Cartesian representation of the embeddings are initialized using normal distribution with a mean of zero and a variance of 0.5. In non-limiting embodiments or aspects, the at least one processor is further programmed or configured to: pre-train a machine-learning model comprising the graph; train the machine-learning model, resulting in trained embeddings; and export the trained embeddings. In non-limiting embodiments or aspects, pre-training the machine-learning model comprises organizing the graph based on negative samples that comprise, for a vertex, two hop neighboring nodes that do not share an edge with the vertex.

According to non-limiting embodiments or aspects, provided is a computer program product for node embedding, comprising at least one non-transitory computer-readable medium including program instructions that, when executed by at least one processor, cause the at least one processor to: generate a graph comprising a plurality of nodes; generate an embedding for each node of the plurality of nodes, each embedding comprising at least one polar angle and a vector length; store each embedding of the plurality of embeddings in memory; and in response to processing the graph with a machine-learning algorithm, convert at least one embedding of the plurality of embeddings to Cartesian coordinates.

In non-limiting embodiments or aspects, the vector length of each embedding is the same value. In non-limiting embodiments or aspects, the at least one polar angle for each embedding is represented in a range of integers between a maximum value and a minimum value, the program instructions further causing the at least one processor to: link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value. In non-limiting embodiments or aspects, the at least one polar angle is represented by a 2-byte signed integer. In non-limiting embodiments or aspects, converting the at least one embedding of the plurality of embeddings to Cartesian coordinates comprises transforming each polar angle of the embedding into two different Cartesian coordinates. In non-limiting embodiments or aspects, the graph is generated using uniform random distributions, and the Cartesian coordinates are embedded using normal distribution with a mean of zero and a variance of 0.5. In non-limiting embodiments or aspects, the program instructions further cause the at least one processor to: pre-train a machine-learning model comprising the graph; train the machine-learning model, resulting in trained embeddings; and export the trained embeddings. In non-limiting embodiments or aspects, pre-training the machine-learning model comprises organizing the graph based on negative samples that comprise, for a vertex, two hop neighboring nodes that do not share an edge with the vertex.

Further non-limiting embodiment or aspects are set forth in the following numbered clauses:

Clause 1: A method for node embedding, comprising: generating, with at least one processor, a graph comprising a plurality of nodes; generating, with the at least one processor, an embedding for each node of the plurality of nodes, each embedding comprising at least one polar angle and a vector length; storing, with the at least one processor, each embedding of the plurality of embeddings in memory; and in response to processing the graph with a machine-learning algorithm, converting at least one embedding of the plurality of embeddings to Cartesian coordinates.

Clause 2: The method of clause 1, wherein the vector length of each embedding is the same value.

Clause 3: The method of clauses 1 or 2, wherein the at least one polar angle for each embedding is represented in a range of integers between a maximum value and a minimum value, further comprising: linking the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

Clause 4: The method of any of clauses 1-3, wherein the at least one polar angle is represented by a 2-byte signed integer.

Clause 5: The method of any of clauses 1-4, wherein converting the at least one embedding of the plurality of embeddings to Cartesian coordinates comprises transforming each polar angle of the embedding into two different Cartesian coordinates.

Clause 6: The method of any of clauses 1-5, wherein the graph is generated using uniform random distributions, and wherein the Cartesian coordinates are embedded using normal distribution with a mean of zero and a variance of 0.5.

Clause 7: The method of any of clauses 1-6, further comprising: pre-training a machine-learning model comprising the graph; training the machine-learning model, resulting in trained embeddings; and exporting the trained embeddings.

Clause 8: The method of any of clauses 1-7, wherein pre-training the machine-learning model comprises organizing the graph based on negative samples that comprise, for a vertex, two hop neighboring nodes that do not share an edge with the vertex.

Clause 9: A system for node embedding, comprising at least one processor programmed or configured to: generate a graph comprising a plurality of nodes; generate an embedding for each node of the plurality of nodes, each embedding comprising at least one polar angle and a vector length; store each embedding of the plurality of embeddings in memory; and in response to processing the graph with a machine-learning algorithm, convert at least one embedding of the plurality of embeddings to Cartesian coordinates.

Clause 10: The system of clause 9, wherein the vector length of each embedding is the same value.

Clause 11: The system of clauses 9 or 10, wherein the at least one polar angle for each embedding is represented in a range of integers between a maximum value and a minimum value, the at least one processor further programmed or configured to: link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

Clause 12: The system of any of clauses 9-11, wherein the at least one polar angle is represented by a 2-byte signed integer.

Clause 13: The system of any of clauses 9-12, wherein converting the at least one embedding of the plurality of embeddings to Cartesian coordinates comprises transforming each polar angle of the embedding into two different Cartesian coordinates.

Clause 14: The system of any of clauses 9-13, wherein the graph is generated using uniform random distributions, and wherein the Cartesian coordinates are embedded using normal distribution with a mean of zero and a variance of 0.5.

Clause 15: The system of any of clauses 9-14, the at least one processor further programmed or configured to: pre-train a machine-learning model comprising the graph; train the machine-learning model, resulting in trained embeddings; and export the trained embeddings.

Clause 16: The system of any of clauses 9-15, wherein pre-training the machine-learning model comprises organizing the graph based on negative samples that comprise, for a vertex, two hop neighboring nodes that do not share an edge with the vertex.

Clause 17: A computer program product for node embedding, comprising at least one non-transitory computer-readable medium including program instructions that, when executed by at least one processor, cause the at least one processor to: generate a graph comprising a plurality of nodes; generate an embedding for each node of the plurality of nodes, each embedding comprising at least one polar angle and a vector length; store each embedding of the plurality of embeddings in memory; and in response to processing the graph with a machine-learning algorithm, convert at least one embedding of the plurality of embeddings to Cartesian coordinates.

Clause 18: The computer program product of clause 17, wherein the vector length of each embedding is the same value.

Clause 19: The computer program product of clauses 17 or 18, wherein the at least one polar angle for each embedding is represented in a range of integers between a maximum value and a minimum value, the program instructions further causing the at least one processor to: link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

Clause 20: The computer program product of any of clauses 17-19, wherein the at least one polar angle is represented by a 2-byte signed integer.

Clause 21: The computer program product of any of clauses 17-20, wherein converting the at least one embedding of the plurality of embeddings to Cartesian coordinates comprises transforming each polar angle of the embedding into two different Cartesian coordinates.

Clause 22: The computer program product of any of clauses 17-21, wherein the graph is generated using uniform random distributions, and wherein the Cartesian coordinates are embedded using normal distribution with a mean of zero and a variance of 0.5.

Clause 23: The computer program product of any of clauses 17-22, wherein the program instructions further cause the at least one processor to: pre-train a machine-learning model comprising the graph; train the machine-learning model, resulting in trained embeddings; and export the trained embeddings.

Clause 24: The computer program product of any of clauses 17-23, wherein pre-training the machine-learning model comprises organizing the graph based on negative samples that comprise, for a vertex, two hop neighboring nodes that do not share an edge with the vertex.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figure, in which.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE®), Worldwide Interoperability for Microwave Access (WiMAX®), etc.), and/or the like. It will be appreciated that numerous other arrangements are possible.

As used herein, the term "computing device" may refer to one or more electronic devices that are configured to process data. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale (POS) devices, directly or indirectly communicating in the network environment may constitute a "system," such as a merchant's POS system. Reference to "a server," "a processor," "at least one processor," and "the at least one processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for node embedding in machine learning. Using the techniques described herein to train node embeddings for graphs using polar coordinates, non-limiting embodiments allow for efficient graph structures to be generated, trained, and stored in memory without overburdening processing and memory capabilities. Node embeddings in polar coordinates allow for more efficient processing of the graph during training, resulting in the use of fewer processor cycles, since information about a particular vector can be compressed into a low-dimensional representation. Moreover, non-limiting embodiments allow for computationally-intensive processes to be carried out, such as cosign similarity determinations, in an efficient manner through the use of polar coordinate vectors. In this way, non-limiting embodiments may allow for the use of a single computing device rather than a distributed system (e.g., a network of computing devices).

Moreover, non-limiting embodiments also provide for increased efficiencies through improving the quality of negative samples used for training the graph of the machine-learning model. For example, through the techniques described herein, the quality of negative samples is improved and, as a result, fewer negative samples need to be trained to obtain high-quality node embeddings. The improved negative sampling improves the processing of skewed graphs, for example. Non-limiting embodiments provide for an efficient similarity-based graph organization technique that aids in creating high-quality negative samples for graphs with a large skew.

Figure 1:
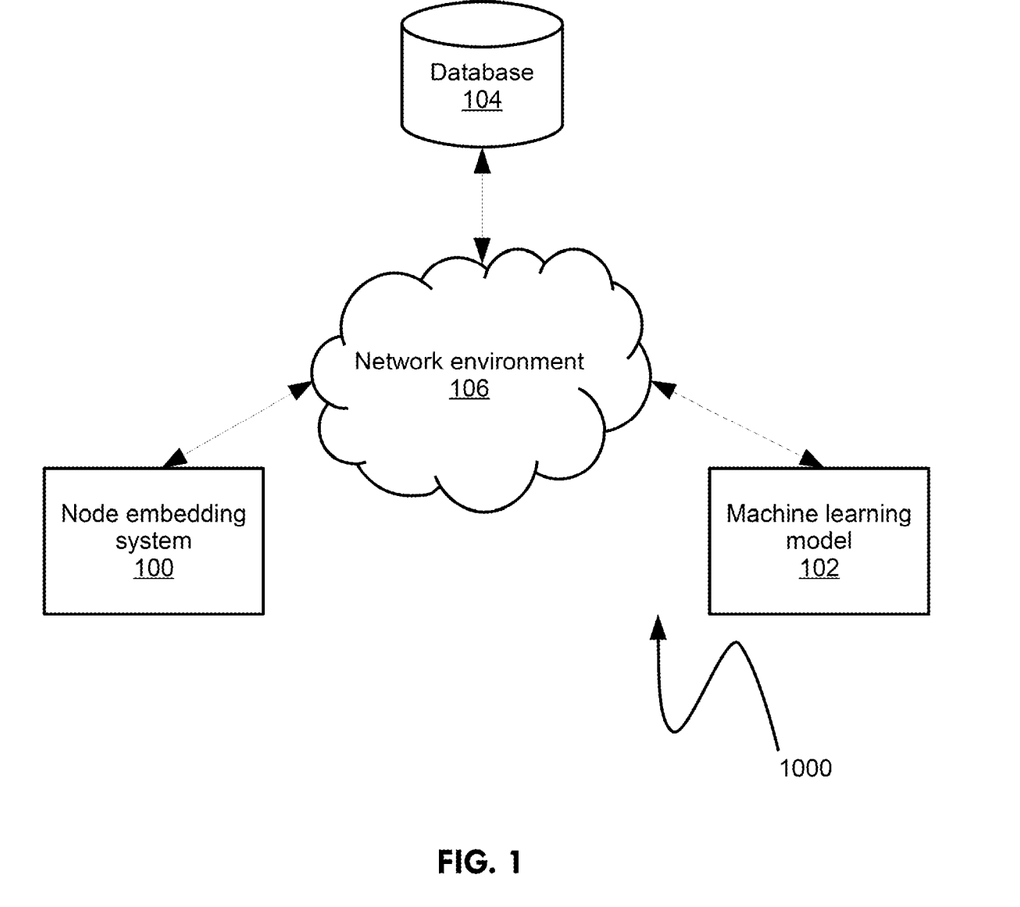
FIG. 1 is a schematic diagram of a system for generating node embeddings according to non-limiting embodiments or aspects.

Referring now to FIG. 1, shown is a system 1000 for generating node embeddings according to non-limiting embodiments. In some non-limiting embodiments or aspects, system 1000 may include node embedding system 100, machine-learning model 102, database 104, and network environment 106. Systems and/or devices that may be operated by a user, such as one or more computing devices, may communicate with systems, such as node embedding system 100, machine-learning model 102, and/or database 104 via one or more network environments 106. In some non-limiting embodiments or aspects, node embedding system 100 may include one or more computing devices (e.g., servers) providing interfaces for one or more computing devices to interact with. For example, node embedding system 100 may include a server, a group of servers, and/or other like devices. In some non-limiting embodiments or aspects, node embedding system 100 may be associated with one or more computing devices providing interfaces such that a user may interact with node embedding system 100 via the one or more computing devices.

With continued reference to FIG. 1, the machine-learning model 102 may include a computing device configured to communicate with node embedding system 100 and/or database 104 via network environment 106. For example, the machine-learning model 102 may include a server, a group of servers, and/or other like devices. In some non-limiting embodiments or aspects, machine-learning model 102 may be associated with one or more computing devices providing interfaces such that a user may interact with machine-learning model 102 via the one or more computing devices. The machine-learning model 102 may be in communication with node embedding system 100 such that the machine-learning model 102 is separate from node embedding system 100. Alternatively, in some non-limiting embodiments, the machine-learning model 102 may be part (e.g., a component) of node embedding system 100. In some non-limiting embodiments or aspects, the machine-learning model 102 may execute on the same computing device as node embedding system 100 or on a separate computing device as node embedding system 100.

The machine-learning model 102 may generate (e.g., train, validate, retrain, and/or the like), store, and/or implement (e.g., operate, provide inputs to and/or outputs from, and/or the like) one or more machine-learning models. In some non-limiting embodiments or aspects, the machine-learning model 102 may include at least one machine-learning algorithm (e.g., supervised learning, unsupervised learning, representation learning, and/or the like). In some non-limiting embodiments or aspects, training machine-learning model 102 may provide one or more trained machine-learning models. In some non-limiting embodiments or aspects, machine-learning model 102 may include an untrained machine-learning model or a trained machine-learning model.

With continued reference to FIG. 1, the database 104 may include a computing device (e.g., a database device) configured to communicate with node embedding system 100 and/or the machine-learning model 102 via the network environment 106. For example, the database 104 may include a server, a group of servers, and/or other like devices. In some non-limiting embodiments or aspects, the database 104 may be associated with one or more computing devices providing interfaces such that a user may interact with the database 104 via the one or more computing devices. The database 104 may be in communication with node embedding system 100 and/or the machine-learning model 102 such that the database 104 is separate from node embedding system 100 and/or the machine-learning model 102. Alternatively, in some non-limiting embodiments, the database 104 may be part (e.g., a component) of node embedding system 100 and/or the machine-learning model 102.

In some non-limiting embodiments or aspects, the database 104 may include a device capable of storing data (e.g., a storage device). In some non-limiting embodiments or aspects, the database 104 may include a collection of data stored and accessed by one or more computing devices. The database 104 may include file system storage, cloud storage, in-memory storage, and/or the like. The database 104 may include non-volatile storage (e.g., flash memory, magnetic media, and/or the like), volatile storage (e.g., random-access memory and/or the like), or both non-volatile and volatile storage. In some non-limiting embodiments, the database 104 may be part (e.g., a component) of node embedding system 100 and/or the machine-learning model 102. In some non-limiting embodiments or aspects, the database 104 may be hosted (e.g., stored and permitted to be accessed by other computing devices via a network environment) on a computing device separate from node embedding system 100 and/or the machine-learning model 102.

The network environment 106 may include one or more wired and/or wireless networks. For example, the network environment 106 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

Figure 2:
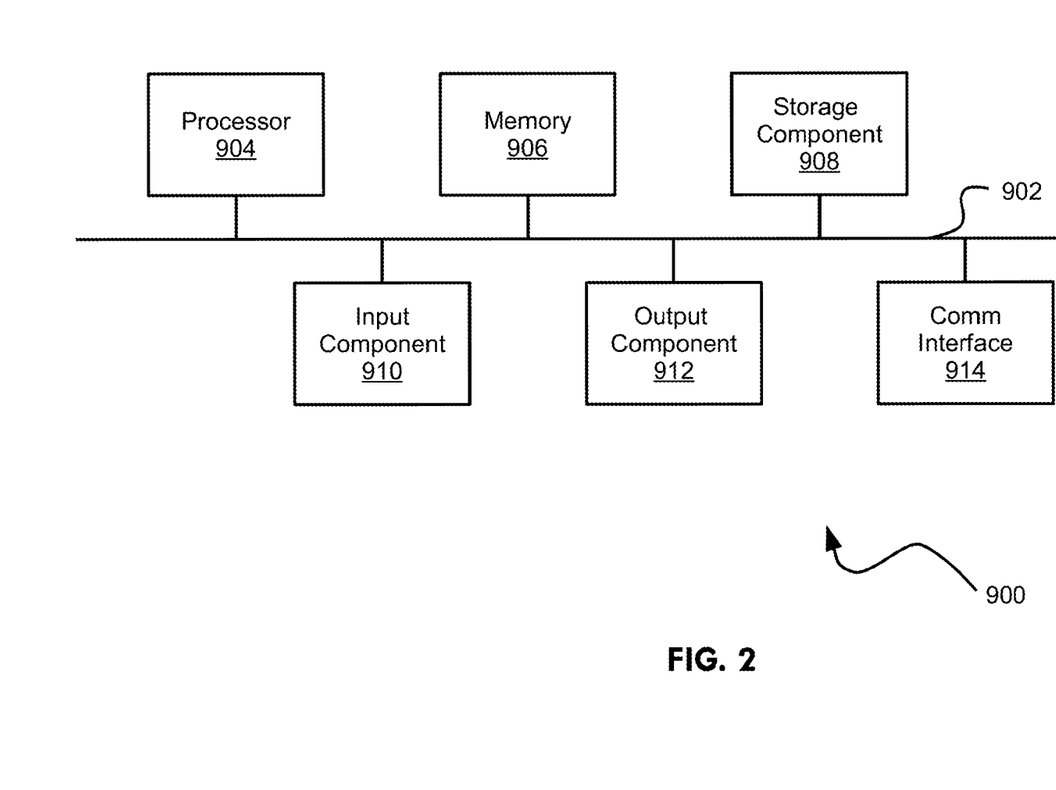
FIG. 2 is a schematic diagram of example components of a computing device for implementing and performing the systems and methods described herein according to non-limiting embodiments.

Referring now to FIG. 2, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 2. Device 900 may include bus 902, processor 904, memory 906, storage component 908, input component 910, output component 912, and communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 2, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. In some non-limiting embodiments or aspects, storage component 908 may be the same as or similar to database 104. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 3:
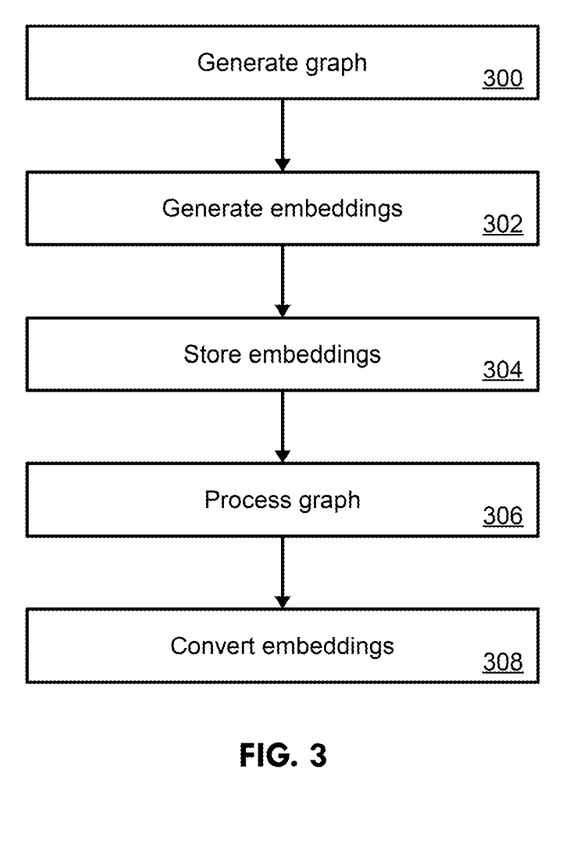
FIG. 3 is a flow diagram of a method for generating node embeddings according to non-limiting embodiments or aspects.

Referring now to FIG. 3, shown is a flow diagram of a method for generating node embeddings according to non-limiting embodiments or aspects. The method may be performed by one or more processors of node embedding system 100, the machine-learning model 102, and/or other computing devices. In some non-limiting embodiments or aspects, one or more steps of the method may be performed (e.g., completely, partially, etc.) by node embedding system 100 (e.g., one or more computing devices of node embedding system 100). In some non-limiting embodiments or aspects, one or more steps of the method may be performed (e.g., completely, partially, etc.) by another device or a group of devices separate from or including node embedding system 100 (e.g., one or more computing devices of node embedding system 100), the machine-learning model 102 (e.g., one or more computing devices of machine-learning model 102), the database 104 (e.g., one or more computing devices of the database 104), and/or the network environment 106 (e.g., one or more computing devices of the network environment 106).

With continued reference to FIG. 3, at step 300, a graph may be generated. For example, node embedding system 100 may generate a graph including a plurality of nodes. In some non-limiting embodiments or aspects, a graph (e.g., graph data structure) may refer to a set (e.g., a plurality) of nodes (e.g., vertices, points, and/or the like) together with a set (e.g., a plurality) of edges (e.g., pairs, links, lines, and/or the like). An edge may connect a first node with a second node such that the first and second node may be said to be related. A graph may include an undirected graph (e.g., the edges are not directed or the edges are unordered) or a directed graph (e.g., the edges are directed or the edges are ordered). In some non-limiting embodiments or aspects, a graph may be defined as G=(V, E), where G is the graph, V is a set of nodes, and E is a set of edges. In some non-limiting embodiments or aspects, an edge may connect a pair of nodes in the graph. For example, an edge may be represented as e=(u, v) where u is a first node, v is a second node, and e is the edge connecting the first node and the second node. In some non-limiting embodiments or aspects, a graph may include a plurality of nodes and a plurality of edges. A graph may be used to represent relationships between objects (e.g., nodes).

In some non-limiting embodiments or aspects, node embedding system 100 may generate the graph using uniform random distributions. For example, node embedding system 100 may generate the graph using uniform random distribution resulting in embedding in the Cartesian coordinate system using a normal distribution with a mean of zero (0) and a variance of 0.5. As a further example, node embedding system 100 may initialize the graph and/or polar representation-based embeddings (e.g., the embeddings comprising at least one polar angle and a vector length, the embeddings generated based on the graph) using uniform random distributions. In some non-limiting embodiments or aspects, when node embedding system 100 initializes the graph and/or polar representation-based embeddings using uniform random distributions, node embedding system may initialize corresponding Cartesian representation-based embeddings (e.g., the Cartesian representation-based embeddings corresponding to the polar representation-based embeddings) using normal distribution with a mean of zero and a variance of 0.5. In this way, uniform random distribution may reduce the complexity of generating the graph as compared to using the normal distribution.

In some non-limiting embodiments or aspects, node embedding system 100 may initialize the polar representation-based embeddings (e.g., the embeddings comprising at least one polar angle and a vector length) using uniform random distribution. For example, node embedding system 100 may initialize the polar representation-based embeddings using uniform random distribution resulting in corresponding Cartesian representation-based embeddings (e.g., embeddings in the Cartesian coordinate system) being initialized by node embedding system 100 using a normal distribution with a mean of zero (0) and a variance of 0.5. In this way, uniform random distribution may reduce the complexity of initializing the embeddings as compared to using the normal distribution.

In some non-limiting embodiments or aspects, node embedding system 100 may pre-train a machine-learning model (e.g., machine-learning model 102) including the graph. For example, node embedding system 100 may pre-train a machine-learning model 102 by processing the graph with the machine-learning model 102 and training the machine-learning model 102 using embeddings. In some non-limiting embodiments or aspects, node embedding system 100 may pre-train a machine-learning model 102 by organizing the graph based on negative samples that include, for a vertex, two hop neighboring nodes that do not share an edge with the vertex. In some non-limiting embodiments or aspects, a two hop neighboring node may include nodes that have at least two edges and one other node between the node and the vertex in a graph. In other words, a two hop neighboring node, with respect to a vertex (e.g., a vertex node), is a first node that connects to a second node via a first edge, and where the second node connects to the vertex via a second edge. The first node is said to be a two hop neighbor of the vertex.

In some non-limiting embodiments or aspects, node embedding system 100 may pre-train the machine-learning model 102 by reading in an input graph. Node embedding system 100 may map all nodes of the plurality of nodes to consecutive numeric identifiers (e.g., 1, 2, 3, etc.). In some non-limiting embodiments or aspects, the consecutive numeric identifiers may represent an index into the plurality of embeddings. For example, a node mapped to a numeric identifier of "2" may correspond to an embedding of the plurality of embeddings indexed as "2" in an embedding array.

In some non-limiting embodiments or aspects, node embedding system 100 may train the machine-learning model 102. For example, node embedding system 100 may train the machine-learning model 102 to produce (e.g., result in) trained embeddings. Node embedding system 100 may export the trained embeddings. In some non-limiting embodiments or aspects, node embedding system 100 may train the machine-learning model 102 based on a loss function. In some non-limiting embodiments or aspects, the loss function may be defined by the following equation:

$$\mathcal{L} = \sum_{(u,v)\in\varepsilon'} S_G(R_u, R_v) - \sum_{(u,v)\in\varepsilon} S_G(R_u, R_v) + \lambda \sum_{v\in V}\sum_{i=1}^{d}(R_v^i)^2$$

where $\mathcal{L}$ is the loss, u is a first node, v is a second node, $\varepsilon'$ is a set of negative edges (e.g., edges not observed in the graph), $\varepsilon$ is a set of observed edges (e.g., edges observed in the graph), d is a dimension of the embeddings (e.g., a dimension of the embedding space), $R_u$ is a first d-dimensional embedding, $R_v$ is a second d-dimensional embedding, $S_G(R_u, R_v)$ is an angular similarity between the first embedding and the second embedding, V is a set of nodes, $R_v^i$ is the $i^{th}$ dimension of the embedding $R_v$, and $\lambda$ is a regularization factor.

In some non-limiting embodiments or aspects, node embedding system 100 may train the machine-learning model 102 based on an asynchronous stochastic gradient algorithm (ASGD). In some non-limiting embodiments or aspects, node embedding system 100 may train the machine-learning model 102 as a multi-threaded application. In some non-limiting embodiments or aspects, at each step, node embedding system 100 may use the ASGD to pick up a batch of edges (e.g., a set of edges), compute gradients, and use the gradients to update the embeddings. In some non-limiting embodiments or aspects, for negative sampling, node embedding system 100 may pick up a batch of negative samples. In some non-limiting embodiments or aspects, node embedding system 100 may obtain negative samples from the current batch of edges. In some non-limiting embodiments or aspects, node embedding system 100 may use an adaptive learning rate per node that linearly decreases with each gradient update. For example, the learning rate for a node u during training may be defined by the following equation:

$$\rho_u = \rho_{initial} \cdot \left(1 - \frac{u_d}{deg(u) \cdot \mathcal{N}}\right)$$

where $\rho_{initial}$ is the initial learning rate, $u_d$ is the count of positive edges processed for u, deg(u) denotes u's degree, and $\mathcal{N}$ denotes a total number of epochs.

At step 302, embeddings may be generated. For example, node embedding system 100 may generate an embedding for each node of the plurality of nodes. In some non-limiting embodiments or aspects, node embedding system 100 may generate an embedding for each node of the plurality of nodes such that the embeddings are represented in a low-dimensional space (e.g., a vector representation, the embedding space, and/or the like). In some non-limiting embodiments or aspects, each embedding may include at least one polar angle and a vector length. In this way, the network structure of the graph and connectivity aspects may be preserved in the embeddings.

In some non-limiting embodiments or aspects, the vector length of each embedding for each node of the plurality of nodes may be a same value. For example, the vector length of a first embedding of a first node may be the same value as the vector length of each other embedding of each other node of the plurality of nodes. In this way, the vector length of each embedding may be equal to the vector length of all other embeddings for each node of the plurality of nodes. In some non-limiting embodiments or aspects, the vector length of each embedding for each node of the plurality of nodes may be equal to one (1). In this way, the need for weight regularization may be eliminated, thus reducing the complexity in the training process and allowing for training using a higher learning rate. In some non-limiting embodiments or aspects, the polar angle of each embedding may be bounded to $-180 \leq \theta < 180$. For example, an embedding $R_u$ may be represented as $R_v = \{\theta_1^v, \theta_2^v, \ldots, \theta_d^v\}$ where $\theta_1^v, \theta_2^v, \ldots, \theta_d^v$ are the polar angles corresponding to d dimensions.

In some non-limiting embodiments or aspects, a gradient of angular distance (e.g., in polar coordinates, in the embedding space) may include the difference between a first polar angle and a second polar angle corresponding to a first embedding vector of a first node and a second embedding vector of a second node, respectively. For a training sample e=(u, v), a loss may be defined by the following equation:

$$\Delta l_n = \theta_n^u - \theta_n^v$$

where u is a first node, v is a second node, n is a dimension, $\theta_n^u$ is the first polar angle corresponding to the first node, $\theta_n^v$ is the second polar angle corresponding to the second node, and $\Delta l_n$ is the loss for the $n^{th}$ dimension training sample. In some non-limiting embodiments or aspects, the difference between a first polar angle and a second polar angle may be based on a smaller angle (e.g., the angle bounded by $-180 \leq \theta < 180$) between the first embedding vector and the second embedding vector. In this way, an angular distance between a first embedding vector and a second embedding vector may be defined by the following equation:

$$\Delta S_G(u, v)_n = \begin{cases} \theta_n^u - \theta_n^v - 360, & \text{if } \theta_n^u - \theta_n^v \leq +180 \\ \theta_n^u - \theta_n^v + 360, & \text{if } \theta_n^u - \theta_n^v < -180 \end{cases}$$

where $\Delta S_G(u, v)_n$ is an $n^{th}$ dimension polar representation for a gradient, $\theta_n^u$ is an $n^{th}$ dimension polar representation for a first node u, and $\theta_n^v$ is an $n^{th}$ dimension polar representation for a second node v. In some non-limiting embodiments or aspects, when executing the above equation for computing gradients on a computing device, the conditional statements may impact the performance of the computing device. This may impede the performance of the computing device when training. In order to eliminate the possible impact to performance, the use of the conditional statements on a computing device may be eliminated, in some non-limiting embodiments, by representing the polar angle and the vector length of an embedding as a 2-byte signed integer (e.g., representing the embedding in a binary number system when read or written by the computing device to memory and/or storage and/or the like).

In some non-limiting embodiments or aspects, the at least one polar angle for each embedding for each node of the plurality of nodes may be represented in a range of integers between a maximum value and a minimum value. For example, the at least one polar angle for each embedding may be represented in a range of integers including a minimum value of −32,768 and a maximum value of 32,767. In some non-limiting embodiments or aspects, the at least one polar angle may be represented by a 2-byte signed integer (e.g., a data type of a 16-bit integer).

In some non-limiting embodiments or aspects, the at least one polar angle for each embedding that is represented in a range of integers may be assigned an integer value. In some non-limiting embodiments or aspects, the integer value assigned to the at least one polar angle for each embedding may be represented as a 2-byte signed integer. In this way, and in some non-limiting embodiments, the polar angle values of the embeddings may be stored in memory such that the conditional statements, when executing the above equation for computing gradients on a computing device, may be eliminated. This may improve the performance of a computing device when training a machine-learning model using the embeddings.

In some non-limiting embodiments or aspects, node embedding system 100 may scale the integer value of the range of integers assigned to the at least one polar angle linearly to a range of −180 to 180. In this way, the Cartesian representation may be obtained.

In some non-limiting embodiments or aspects, the equation for the gradient computation may be defined by the following equation, where the at least one polar angle for each embedding is represented as a 2-byte signed integer:

$$\Delta S_G(u,v)_n = \theta_n^u - \theta_n^v$$

where $\Delta S_G(u, v)_n$ is an $n^{th}$ dimension polar representation for a gradient using a signed integer, $\theta_n^u$ is an $n^{th}$ dimension polar representation for a first node u using a signed integer, and $\theta_n^v$ is an $n^{th}$ dimension polar representation for a second node v using a signed integer.

In some non-limiting embodiments or aspects, node embedding system 100 may link the maximum value and the minimum value, such that when a polar angle value equal to the minimum value (e.g., the polar angle represents the minimum value of the range of integers) is reduced by a value of one (1), the polar angle value becomes equal to the maximum value (e.g., the polar angle represents the maximum value of the range of integers). Additionally, node embedding system 100 may link the maximum value and the minimum value such that when the polar angle value equal to the maximum value is increased by a value of one (1), the polar angle value becomes equal to the minimum value.

In some non-limiting embodiments or aspects, node embedding system 100 may update the gradients for training. For example, node embedding system 100 may update the gradients using the following equations:

$$\theta_n^u = \theta_n^u - \Delta S_G(u,v)_n$$

$$\theta_n^v = \theta_n^v + \Delta S_G(u,v)_n$$

where $\Delta S_G(u, v)_n$ is an $n^{th}$ dimension polar representation for a gradient using a signed integer, $\theta_n^u$ is an $n^{th}$ dimension polar representation for a first node u using a signed integer, and $\theta_n^v$ is an $n^{th}$ dimension polar representation for a second node v using a signed integer.

In some non-limiting embodiments or aspects, the distance between the embeddings in the embedding space may be represented by angular similarity. In some non-limiting embodiments or aspects, angular similarity may be defined by $S_G = 1 - \cos^{-1}(\text{cosine similarity})/\pi$, where $S_G$ is the angular similarity between two embeddings for two nodes. In some non-limiting embodiments or aspects, an angular similarity between two embeddings (e.g., embeddings for nodes) closer to 1.0 represents that an edge exists between the nodes. In some non-limiting embodiments or aspects, an angular similarity between two embeddings (e.g., embeddings for nodes) closer to 0.0 represents that an edge does not exist between the nodes. In some non-limiting embodiments or aspects, the angular similarity between a first embedding for a first node $R_u$ and a second embedding for a second node $R_v$ may be defined by the following equation:

$$S_G(R_u, R_v) = 1 - \frac{\left(\frac{R_u \cdot R_v}{\|R_u\| \cdot \|R_v\|}\right)}{\pi}$$

where $R_u$ is the first embedding, $R_v$ is the second embedding, u is the first node, v is the second node, and $S_G(R_u, R_v)$ is the angular similarity between the first embedding and the second embedding. In some non-limiting embodiments or aspects, the angular similarity may be preserved in the embedding space when generating an embedding for each node of the plurality of nodes. In this way, nodes in the graph which are connected by an edge will have an angular similarity closer to 1.0 in the embedding space, while nodes in the graph which are not connected by an edge will have an angular similarity closer to 0.0 in the embedding space.

With continued reference to FIG. 3, at step 304, embeddings may be stored. For example, node embedding system 100 may store each embedding of a plurality of embeddings in memory. In some non-limiting embodiments or aspects, node embedding system 100 may store the graph in a database (e.g., database 104) and/or memory. In some non-limiting embodiments or aspects, node embedding system 100 may load a batch of edges (e.g., a set of edges including nodes) in memory for processing. For example, node embedding system 100 may load a batch of edges (where an edge e=(u, v)) into memory for processing the batch of edges to generate embeddings for each node of the plurality of nodes. After node embedding system 100 generates the embeddings, node embedding system 100 may store the embeddings in memory (e.g., main memory).

At step 306, a graph may be processed. For example, the machine-learning model 102 may process the graph including the plurality of nodes. In some non-limiting embodiments or aspects, the machine-learning model 102 may be trained by node embedding system 100 using the graph. In some non-limiting embodiments or aspects, the machine-learning model 102 may generate a prediction (e.g., a prediction of a label and/or the like) based on processing the graph.

With continued reference to FIG. 3, at step 308, the embeddings may be converted. For example, node embedding system 100 may convert at least one embedding of the plurality of embeddings to Cartesian coordinates. An embedding in Cartesian coordinates may be represented by $R_v = \{x_1^v, x_2^v, \ldots, x_d^v\}$ where $x_1^v, x_2^v, \ldots, x_d^v$ are floating-point weights corresponding to d dimensions. In some non-limiting embodiments or aspects, node embedding system 100 may convert the at least one embedding of the plurality of embeddings in response to processing the graph including the plurality of nodes with the machine-learning model 102.

In some non-limiting embodiments or aspects, node embedding system 100 may convert at least one embedding of a plurality of embeddings to Cartesian coordinates using the following equations:

$$x_1 = \cos(\theta_1) \quad x_2 = \sin(\theta_1)$$

$$x_3 = \cos(\theta_2) \quad x_4 = \sin(\theta_2)$$

$$\cdot$$
$$\cdot$$
$$\cdot$$

$$x_{2d-1} = \cos(\theta_d) \quad x_{2d} = \sin(\theta_d)$$

where the set $\{x_1, x_2, \ldots, x_{2d}\}$ is the 2d-dimensional Cartesian representation of the d-dimensional polar representation $\{\theta_1, \theta_2, \ldots, \theta_d\}$. In this way, the number of dimensions for training can be cut in half, thus reducing the memory footprint required for training and reducing the computational complexity for computing gradients and updating each embedding. In some non-limiting embodiments or aspects, using a polar representation with 2-byte signed integers may provide a reduction in the memory footprint of stored embeddings by up to 75% compared to the Cartesian representation.

In some non-limiting embodiments or aspects, node embedding system 100 may convert at least one embedding of a plurality of embeddings to Cartesian coordinates by transforming each polar angle of the at least one embedding into two different Cartesian coordinates (e.g., an x-coordinate and a y-coordinate, an $x_1$ and an $x_2$ coordinate, and/or the like). In some non-limiting embodiments or aspects, node embedding system 100 may embed the Cartesian coordinates using a normal distribution with a mean of zero (0) and a variance of 0.5.

Figure 4A:
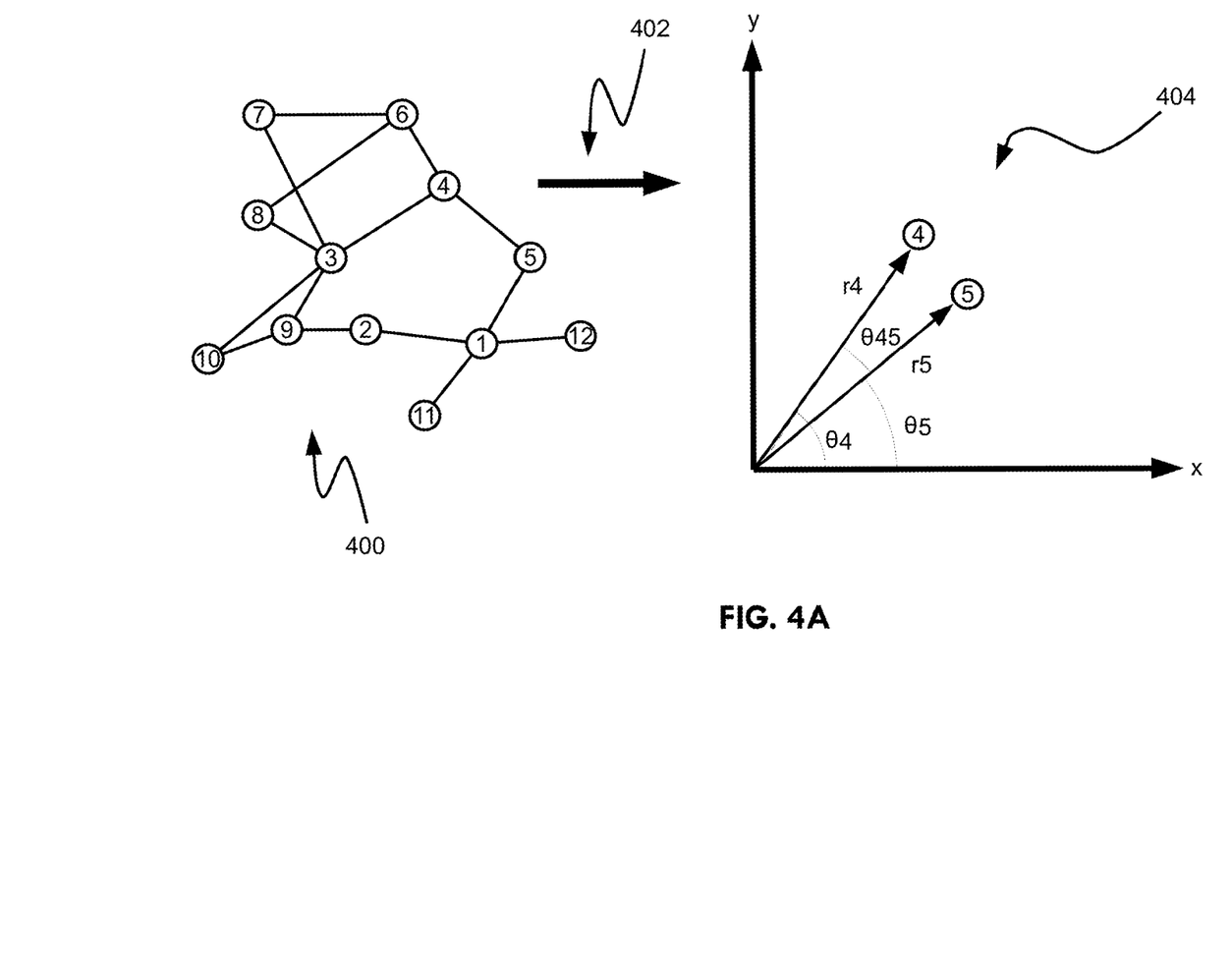
FIGS. 4A and 4B are diagrams of an implementation for generating node embeddings according to non-limiting embodiments or aspects.
Figure 4B:
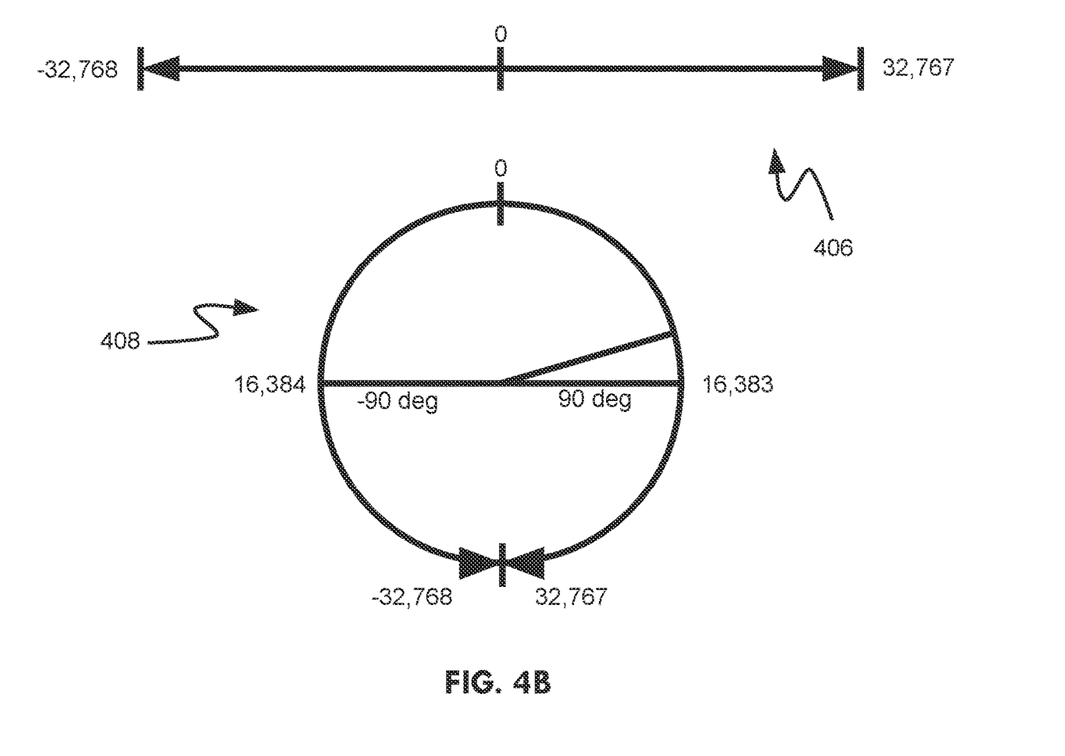

Referring now to FIGS. 4A and 4B, FIGS. 4A and 4B are diagrams of an implementation for generating node embeddings according to non-limiting embodiments or aspects. In some non-limiting embodiments or aspects, the implementation shown in FIGS. 4A and 4B may include an implementation of one or more steps of a process (e.g., the process shown in FIG. 3).

As shown by reference 400 in FIG. 4A, node embedding system 100 may generate a graph including a plurality of nodes. For example, node embedding system 100 may generate a graph including a plurality of nodes including consecutive numeric identifiers. In some non-limiting embodiments or aspects, node embedding system 100 may map all nodes of the plurality of nodes to consecutive numeric identifiers (e.g., 1, 2, 3, etc.). In some non-limiting embodiments or aspects, the consecutive numeric identifiers may represent an index into the plurality of embeddings. In some non-limiting embodiments or aspects, each node of the plurality of nodes may be connected to at least one second node via an edge. In some non-limiting embodiments or aspects, an edge may represent a relation between the nodes connected by the edge. In some non-limiting embodiments or aspects, node embedding system 100 may generate a graph including a plurality of nodes and a plurality of edges.

As shown by reference 402 in FIG. 4A, node embedding system 100 may generate an embedding for each node of the plurality of nodes. In some non-limiting embodiments or aspects, as shown by reference 404, node embedding system 100 may generate each embedding such that each embedding includes at least one polar angle and a vector length. For example, node embedding system 100 may generate an embedding for node 4 of the plurality of nodes. The embedding for node 4 may include a polar angle θ4 and a vector length r4.

In some non-limiting embodiments or aspects, node embedding system 100 may store each embedding of a plurality of embeddings in memory. For example, node embedding system 100 may store the embedding for node 4 in memory as a polar angle θ4. In some non-limiting embodiments or aspects, node embedding system 100 may store the polar angle represented as a 2-byte signed integer. In some non-limiting embodiments or aspects, node embedding system 100 may generate an angular similarity and an angular distance (e.g., a gradient) between a first embedding and a second embedding. For example, node embedding system 100 may generate an angular similarity between the embedding for node 4 and the embedding for node 5 based on θ4 and θ5. Node embedding system 100 may generate an angular distance between the embedding for node 4 and the embedding for node 5 based on θ4 and θ5. In some non-limiting embodiments or aspects, the angular distance may be generated based on a smaller angle (e.g., based on the angle shown by θ45).

In some non-limiting embodiments or aspects, node embedding system 100 may, in response to processing the graph with a machine-learning algorithm, convert at least one embedding of the plurality of embeddings to Cartesian coordinates. For example, in response to processing the graph with the machine-learning model 102, node embedding system 100 may convert the embedding of node 4 to Cartesian coordinates. In some non-limiting embodiments or aspects, node embedding system 100 may scale the 2-byte integer representation of at least one embedding of the plurality of embeddings to a polar angle (e.g., $-180 \leq \theta < 180$) before converting the embedding to Cartesian coordinates. In some non-limiting embodiments or aspects, node embedding system 100 may convert at least one embedding of the plurality of embeddings to Cartesian coordinates by transforming each polar angle of the at least one embedding into two different Cartesian coordinates (e.g., an x-coordinate and a y-coordinate).

Referring now to FIG. 4B, as shown by reference number 406, node embedding system 100 may store the at least one polar angle as represented by a 2-byte signed integer. In some non-limiting embodiments or aspects, node embedding system 100 may present the at least one polar angle for each embedding in a range of integers between a maximum value and a minimum value. In some non-limiting embodiments or aspects, the range for a 2-byte signed integer may include a maximum value of 32,767 and a minimum value of –32,768. In some non-limiting embodiments or aspects, node embedding system 100 may store at least one polar angle represented by a 2-byte signed integer in memory and/or storage of a computing device based on the range from the minimum value to the maximum value.

As shown by reference number 408, node embedding system 100 may link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value. In some non-limiting embodiments or aspects, node embedding system 100 may represent at least one polar angle for each embedding in the range of integers between the maximum and minimum values based on the range of values when the maximum value and the minimum value are linked. For example, node embedding system 100 may represent a polar angle with a value of 90° as a 2-byte signed integer equal to 16,383 and a polar angle with a value of –90° as a 2-byte signed integer equal to –16,384. Node embedding system 100 may assign the 2-byte signed integer value to at least one polar angle based on a position of a vector having a polar angle in the range of values when the maximum value and the minimum value are linked.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for node embedding, comprising:
   generating, with at least one processor, a graph comprising a plurality of nodes;
   pre-training a machine-learning model based on the graph by organizing the graph based on negative samples, the negative samples comprising, for a vertex, two hop neighboring nodes that do not share an edge with the vertex;
   generating, with the at least one processor, an embedding for each node of the plurality of nodes, each embedding comprising at least one polar angle and a vector length, resulting in a plurality of embeddings in polar representation;
   training, with the at least one processor, the machine-learning model based on the plurality of embeddings in polar representation, resulting in a plurality of trained embeddings; and
   after training the machine-learning model, converting the plurality of trained embeddings to Cartesian coordinates when storing the plurality of trained embeddings in memory.

2. The method of claim 1, wherein the vector length of each embedding is a same value.

3. The method of claim 1, wherein the at least one polar angle for each embedding is represented in a range of integers between a maximum value and a minimum value, further comprising:
   linking the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

4. The method of claim 1, wherein the at least one polar angle is represented by a 2-byte signed integer.

5. The method of claim 1, wherein converting the at least one embedding of the plurality of embeddings to the Cartesian coordinates comprises transforming each polar angle of the at least one embedding into two different Cartesian coordinates.

6. The method of claim 1, wherein the graph is generated using uniform random distributions, and wherein the Cartesian coordinates are embedded using normal distribution with a mean of zero and a variance of 0.5.

7. The method of claim 1, further comprising:
   exporting the trained embeddings.

8. A system for node embedding, comprising at least one processor programmed or configured to:
   generate a graph comprising a plurality of nodes;
   pre-train a machine-learning model based on the graph by organizing the graph based on negative samples, the negative samples comprising, for a vertex, two hop neighboring nodes that do not share an edge with the vertex;
   generate an embedding for each node of the plurality of nodes, each embedding comprising at least one polar angle and a vector length, resulting in a plurality of embeddings in polar representation;
   train the machine-learning model based on the plurality of embeddings in polar representation, resulting in a plurality of trained embeddings; and
   after training the machine-learning model, convert the plurality of trained embeddings to Cartesian coordinates when storing the plurality of trained embeddings in memory.

9. The system of claim 8, wherein the vector length of each embedding is a same value.

10. The system of claim 8, wherein the at least one polar angle for each embedding is represented in a range of integers between a maximum value and a minimum value, the at least one processor is further programmed or configured to:
    link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

11. The system of claim 8, wherein the at least one polar angle is represented by a 2-byte signed integer.

12. The system of claim 8, wherein converting the at least one embedding of the plurality of embeddings to the Cartesian coordinates comprises transforming each polar angle of the at least one embedding into two different Cartesian coordinates.

13. The system of claim 8, wherein the graph is generated using uniform random distributions, and wherein the Cartesian coordinates are embedded using normal distribution with a mean of zero and a variance of 0.5.

14. The system of claim 8, wherein the at least one processor is further programmed or configured to:
    export the trained embeddings.

15. A computer program product for node embedding, comprising at least one non-transitory computer-readable medium including program instructions that, when executed by at least one processor, cause the at least one processor to:
    generate a graph comprising a plurality of nodes;
    pre-train a machine-learning model based on the graph by organizing the graph based on negative samples, the negative samples comprising, for a vertex, two hop neighboring nodes that do not share an edge with the vertex;
    generate an embedding for each node of the plurality of nodes, each embedding comprising at least one polar angle and a vector length, resulting in a plurality of embeddings in polar representation;
    train the machine-learning model based on the plurality of embeddings in polar representation, resulting in a plurality of trained embeddings; and
    after training the machine-learning model, convert the plurality of trained embeddings to Cartesian coordinates when storing the plurality of trained embeddings in memory.

16. The computer program product of claim 15, wherein the vector length of each embedding is the same value.

17. The computer program product of claim 15, wherein the at least one polar angle for each embedding is represented in a range of integers between a maximum value and a minimum value, the program instructions further causing the at least one processor to:
    link the maximum value and the minimum value, such that when a polar angle value equal to the minimum value is reduced by a value of one, the polar angle value becomes equal to the maximum value, and when the polar angle value is equal to the maximum value and is increased by a value of one, the polar angle value becomes equal to the minimum value.

18. The computer program product of claim 15, wherein the at least one polar angle is represented by a 2-byte signed integer.

19. The computer program product of claim 15, wherein converting the at least one embedding of the plurality of embeddings to the Cartesian coordinates comprises transforming each polar angle of the at least one embedding into two different Cartesian coordinates.

20. The computer program product of claim 15, wherein the graph is generated using uniform random distributions, and wherein the Cartesian coordinates are embedded using normal distribution with a mean of zero and a variance of 0.5.

21. The computer program product of claim 15, wherein the program instructions further cause the at least one processor to:

export the trained embeddings.

\* \* \* \* \*